(12) United States Patent
Li et al.

(10) Patent No.: US 6,422,100 B1
(45) Date of Patent: Jul. 23, 2002

(54) INDEPENDENTLY-TENSIONED MULTIPLE-CABLE TRANSLATION SYSTEM

(75) Inventors: Peter Y. Li, Woodbury; Paul C. Schubert, Marine on St. Croix; Timothy S. Vraa, Rosemount, all of MN (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/606,506

(22) Filed: Jun. 29, 2000

(51) Int. Cl.[7] ............................................... F16H 27/02
(52) U.S. Cl. ..................................................... 74/89.22
(58) Field of Search ............................... 74/89.21, 89.22

(56) References Cited

U.S. PATENT DOCUMENTS

| | | | | |
|---|---|---|---|---|
| 3,502,882 A | * | 3/1970 | Von Voros | .................. 250/202 |
| 3,659,468 A | * | 5/1972 | Alford et al. | ............... 74/89.22 |
| 4,116,568 A | * | 9/1978 | Suzuki et al. | ................ 400/320 |
| 4,203,680 A | * | 5/1980 | Mitrovich | .................... 400/335 |
| 5,956,071 A | | 9/1999 | Mattila et al. | |
| 6,064,416 A | | 5/2000 | Esch et al. | |

* cited by examiner

*Primary Examiner*—Allan D. Herrmann
(74) *Attorney, Agent, or Firm*—William F. Novel (57) ABSTRACT

A translation system comprising: a linear support having first and second opposite ends; a carriage slid ably mounted on said support for movement in reciprocal linear directions between said first and second ends of said support; a rotary drive rotatable in opposite rotary directions located at one end of said support; a rotatable member mounted at the other end of said support; and a multiple cable assembly attached to said carriage and extending around said rotary drive and said rotatable member moving said carriage in said reciprocal linear directions as a function of rotation of said rotary drive in said opposite rotary directions.

4 Claims, 7 Drawing Sheets

INDEPENDENTLY-TENSIONED MULTIPLE-CABLE TRANSLATION SYSTEM

FIELD OF THE INVENTION

This invention relates in general to internal drum scanner assemblies and laser imaging systems incorporating such scanner assemblies. In particular, the present invention relates to a translation system for moving a laser or optical scanning system relative to media being scanned.

BACKGROUND OF THE INVENTION

Laser imaging systems are commonly used to produce photographic images from digital image data generated by magnetic resonance (MR), computed tomography (CT) or other types of medical image scanners. Systems of this type typically include a continuous tone laser imager for exposing the image on photosensitive film, a film processor for developing the film, and an image management subsystem for coordinating the operation of the laser imager and the film processor.

The digital image data is a sequence of digital image values representative of the scanned image. Image processing electronics within the image management subsystem processes the image data values to generate a sequence of digital laser drive values (i.e., exposure values), which are input to a laser scanner. The laser scanner is responsive to the digital laser drive values for scanning across the photosensitive film in a raster pattern for exposing the image on the film.

The continuous-tone images used in the medical imaging field have very stringent image-quality requirements. A laser imager printing onto transparency film exposes an image in a raster format, the line spacing of which must be controlled to better than one micrometer. In addition, the image must be uniformly exposed such that the observer cannot notice any artifacts. In the case of medical imaging, the observers are professional image analysts (e.g., radiologists).

Film exposure systems are used to provide exposure of the image on photosensitive film. Known film exposure systems include a linear translation system and a laser or optical scanning system. The laser scanning system includes a laser scanner with unique optical configurations (i.e., lenses and mirrors) for exposure of the image onto the film. The linear translation system provides for movement of the laser scanning system in a direction perpendicular to the scanning direction, such that a fall image may be scanned on a piece of photosensitive film.

In an internal drum type laser scanner assembly, a piece of film is positioned onto a film platen, wherein the film platen has a partial cylindrical or partial drum shape. The photosensitive film is positioned against the film platen. The laser or optical scanning system is positioned at the center of curvature of the photosensitive film for scanning a scan line across the photosensitive film surface. A linear translation system moves the laser or optical scanning system lengthwise along a longitudinal axis as defined by the center of curvature of the film to expose an entire image onto the film.

Traditional linear translation systems include three main components, a stationary member, a moving member (e.g., a carriage), and a drive mechanism. In a linear translation system where rigidity, positional accuracy, and high load carrying capacity are required, lead screw mechanisms are preferred as the drive mechanism. Belts and cable systems are used in systems characterized by flexibility, light loads, and low costs, such as plotters and ink jet printers.

Known linear translation systems are usually designed for positional repeatability. Although such systems work well for positional repeatability type scanning operations, such linear translation systems were not designed to minimize velocity variation which is critical for imaging continuous tone photosensitive film. In continuous laser scanning applications, velocity variations cause the scan lines to be unevenly spaced and result in a variety of image artifacts on the photosensitive film.

U.S. Pat. No. 6,064,416, issued May 16, 2000, inventors Esch et al., discloses an optics translation module with a single drive cable. The optics translation module uniformly places laser scan lines to form complete images. The translation direction is perpendicular to the scan line direction.

The optics translation module, controls image quality in the cross scan direction. Speed variation will be reflected in images as bands or streaks of non-uniform densities on film. Unstable motion during the translation of the optics module causes inaccurate placement of pixels, resulting in a variety of image artifacts.

In this design, a translation carriage with kinematic support on a pair of cylindrical rails is used. The carriage, with precision mounting surfaces, serves as an interface between the optics module and the optics translation module. Kinematic support is achieved by a pair of V-shaped bearing surfaces and a flat sliding surface built into the carriage. When the carriage slides on the rails during translation, there is little friction on the carriage in the translation direction, while its position is rigidly determined in the other directions.

Weight of the carriage and the attached optics module is necessary for maintaining contact between the carriage and the rails. If the carriage is lifted from the rails, the kinematic support will not function properly. The position of the carriage will then be undetermined.

The optics module is attached to the translation carriage with position reference at an edge formed by two perpendicular planes. This ensures easy mounting of the optics module to the translation module.

The support points of the carriage need to enclose the center of gravity of the optics module and carriage assembly.

A cable drive mechanism is used for driving the translation carriage. For a carriage that relies on kinematic mounting, the drive mechanism should exert as little force as possible in the directions perpendicular to the translation direction. The cable drive mechanism satisfies this requirement. Cable drive is also suitable in this application because of the low load and low mass nature of the carriage and optics module.

The cable is driven by a pair of pulleys, one of which is the drive pulley and the other an idler. The pulleys have 90-degree V-grooves for holding the cable at its desired location.

The drive pulley for the cable is attached to the coaxial with a circular flywheel. The flywheel is driven by a stepping motor through friction drive. On the shaft of the stepping motor, a polyurethane tire is mounted for driving the flywheel through friction.

In order to maintain desired speed uniformity, to better than 0.25% error for motor once-around, the tire needs to be ground on the motor after it is mounted on the motor shaft.

A nylon coated steel cable is used. The cable needs to be strong (i.e., high Young's modulus) so that the spring constant of the cable in the longitudinal direction is high. For durability of the cable, it needs to be flexible enough to be used with the pulleys.

For long term performance stability of the mechanism, a cable tensioner is necessary. In this design, the cable tensioner is a compression spring.

Mass of the optics module and the carriage, along with the spring constants of the cable and cable tensioner spring, determine the resonant frequency of the translation module. Since it is desirable to increase the resonant frequency, reduced total mass that is attached to the cable is a design consideration.

There is a need for a translation system which overcomes the problems and satisfies the needs discussed before.

SUMMARY OF THE INVENTION

According to the present invention, there is provided a translation system which satisfies the needs and overcomes the problems of known systems.

According to a feature of the present invention, there is provided a translation system comprising: a linear support having first and second opposite ends; a carriage slid ably mounted on said support for movement in reciprocal linear directions between said first and second ends of said support; a rotary drive rotatable in opposite rotary directions located at one end of said support; a rotatable member mounted at the other end of said support; and a multiple cable assembly attached to said carriage and extending around said rotary drive and said rotatable member moving said carriage in said reciprocal linear directions as a function of rotation of said rotary drive in said opposite rotary directions.

ADVANTAGEOUS EFFECT OF THE INVENTION

The invention has the following advantages.

1. Higher rigidity over single drive cable systems.

2. Ease in tracking over metal belt system, ease of alignment, assembly and adjustment over lead screw systems.

3. Overall system cost can be substantially lower that those for a lead screw or a linear motor system with equivalent performance.

4. The spring stiffness of the drive system is increased approximately by a factor equal to the number of cables used. Independently driven and tensioned cables are easy to align, assemble and adjust.

5. Multiple cable driven system significantly reduces system sensitivity to external noise disturbance, when compared with a single cable drive system.

DETAILED DESCRIPTION OF THE INVENTION

Figure 1:
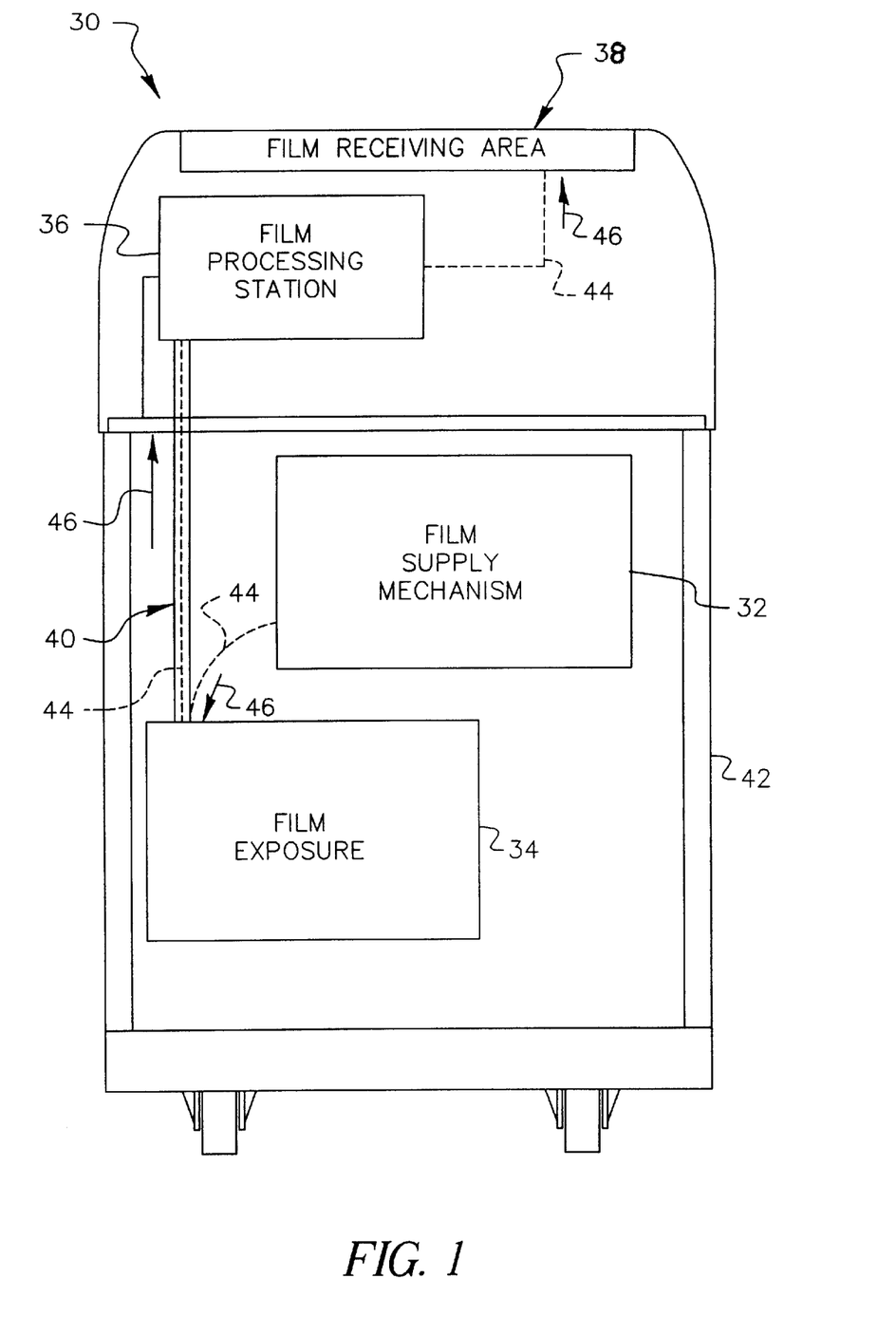
FIG. 1 is a diagrammatic elevational view of a laser imaging apparatus including the present invention.

FIG. 1 is an elevational diagram illustrating an exemplary embodiment of a laser imaging system 30 suitable for use in the medical imaging industry including optical scanning assembly translation system in accordance with the present invention. The imaging system 30 includes a film supply mechanism 32, a film exposure assembly 34, a film processing station 36, a film receiving area 38, and a film transport system 40. The film supply mechanism 32, film exposure assembly 34, film processing station 36, and film transport system 40 are all located within an imaging system housing 42.

Photosensitive film is stored within the film supply mechanism 32. The film transport system 40 allows the photosensitive film to be moved between the film exposure assembly 34, film processing station 36, and the film receiving area 38. The film transport system 40 may include a roller system (not shown) to aid in transporting the film along a film transport path, indicated by dashed line 44. The direction of film transport along film transport path 44 is indicated by arrows 46. In particular, the film supply mechanism 32 includes a mechanism for feeding a piece of film along film transport path 44 into the film exposure assembly 34 for exposing the desired image on the photosensitive film using a laser or optical scanner assembly. After exposure of the desired image on the photosensitive film, the photosensitive film is moved along the film transport path 44 to the film processing station 36. The film processing station 36 develops the image on the photosensitive film. After film development, the photosensitive film is transported to the film receiving area 38.

The invention has been described in detail with particular reference to certain preferred embodiments thereof, but it will be understood that variations and modifications can be effected within the spirit and scope of the invention.

Figure 2:
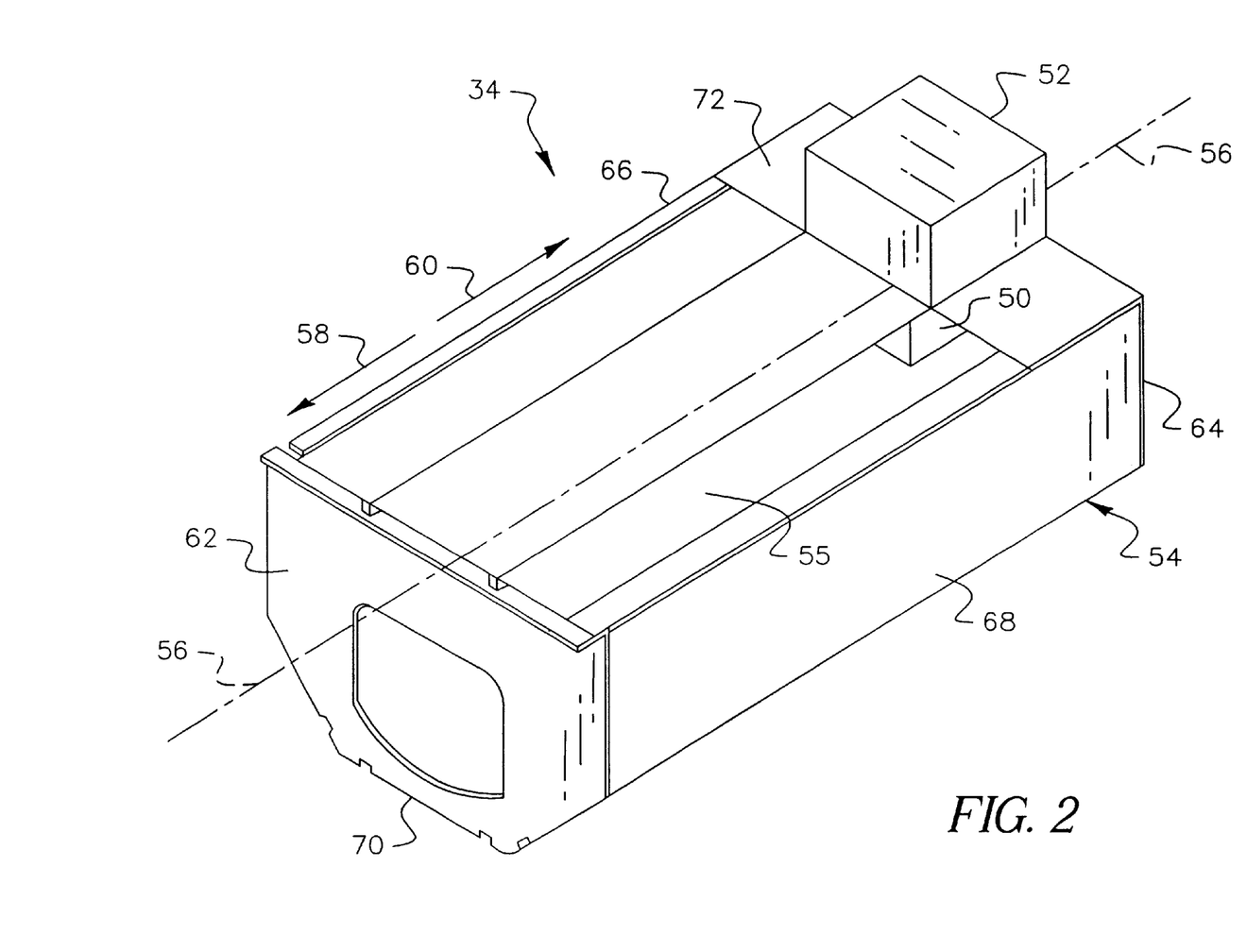
FIG. 2 is a perspective view of an exemplary film exposure assembly incorporating the present invention.

FIG. 2 shows a top perspective view of the film exposure assembly 34 including a mechanism for positioning a photosensitive film into a scanned position in accordance with the present invention. The film exposure assembly 34 has an internal-drum type configuration. The film exposure assembly 34 includes a laser or optical scanner assembly 50 mechanically coupled to a linear translation system 52, mounted within drum frame 54 for exposure of the film. The drum frame 54 includes a curved film platen 55, which can be defined as the internal drum surface. The center of curvature of the curved film platen 55, which is coincident with the drum longitudinal axis 56 is indicated by a dashed line. During a scanning process, the optics translation system 52 operates to move the optical scanner assembly 50 along the longitudinal axis 56 (in a direction generally perpendicular to the scanning direction), indicated by directional arrow 58, and after scanning, returns the optical scanner assembly 50 to a start position, along the longitudinal axis 56, indicated by directional arrow 60.

Drum frame 54 is constructed of metal, and includes a first end 62, a second end 64, a first side 66, a second side 68, a bottom 70, and a top 72. Film platen 55 is positioned within the drum frame 54. Film platen 55 provides a cylindrical or partially cylindrically-shaped scanning surface.

The linear translation system 52 extends along the top 72 for positioning the optical scanner assembly 50 along the center of curvature (of a piece of film in scanning position on the film platen), indicated as longitudinal axis 56. In particular, the linear translation system 52 is positioned between the first end 62 and the second end 64.

Figure 3:
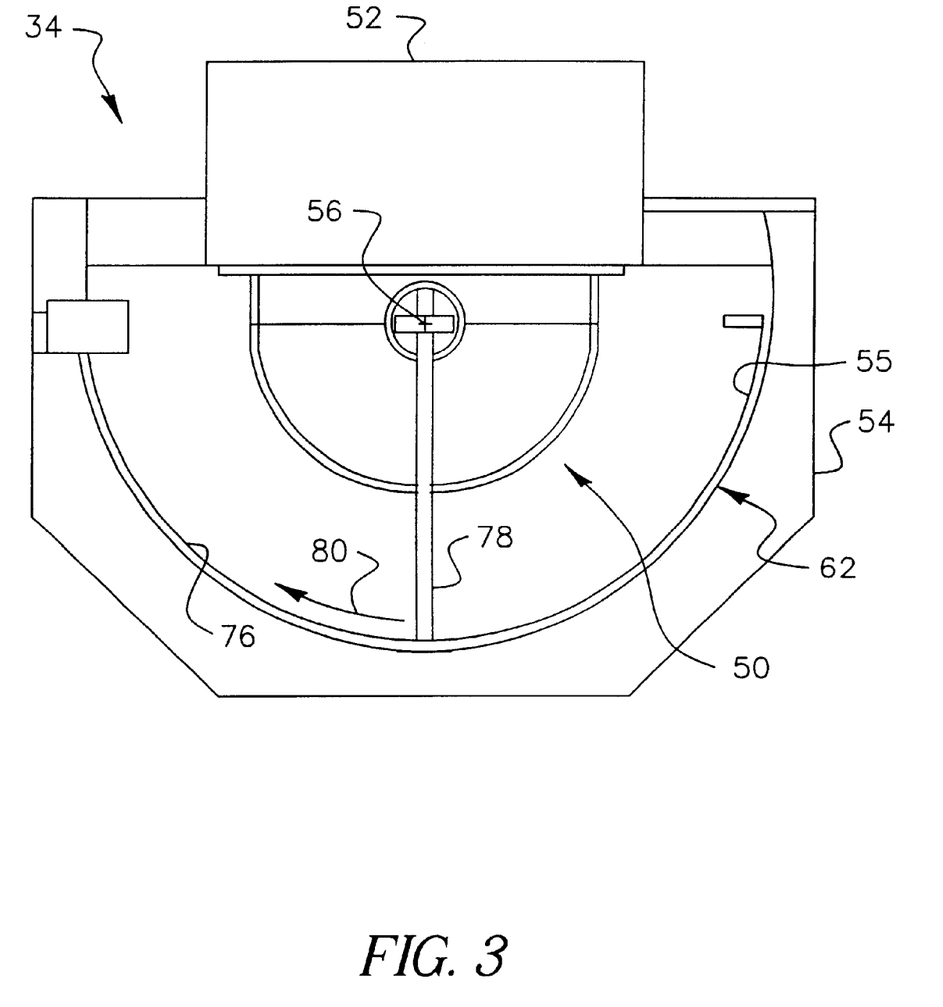
FIG. 3 is an end view of the film exposure assembly shown in FIG. 2.

Referring to FIG. 3, an end elevational view of the film exposure assembly 34 is shown, having a portion of the drum frame 54 removed for clarity. Laser or optical scanner assembly 50 is shown mechanically coupled to the linear translation system 52, positioned along the center of curvature.

A piece of photosensitive film 76 is shown positioned on the film platen 55. During exposure of the photosensitive film 76, the photosensitive film 76 is held against the film platen 55 in a scanning position. In a scanning position the photosensitive film 76 assumes the shape of the curved film platen 55, which has a cylindrical, partial cylindrical, or drum shape. The photosensitive film 76 is positioned in a scanning position (i.e., aligned and centered) using the film positioning mechanism as described in U.S. Pat. No. 5,956,071.

In the scanning position, the photosensitive film 76 is aligned (skew removed), centered and held against the film platen 55. The optical scanner assembly 50 scans a laser beam representative of an image to be exposed on the film, across the film scanning surface in an image-wise pattern. In particular, the scanning laser beam (indicated at 78) emanates radially from the center of curvature of the film platen 55 and film 76, which is coincident with longitudinal axis 56. The optical scanner assembly 50 scans the laser beam containing image data representative of the image to be exposed in raster lines by rotating about the longitudinal axis 56 of the cylinder drum (indicated by directional arrow 80). As the optical scanner assembly 50 scans the image and raster lines in an image-wise pattern across the photosensitive film 76 located on the internal drum surface 55, the linear translation system 52 moves the optical scanner assembly 50 along longitudinal axis 56 to expose a full image on the photosensitive film. The linear translation system 52 moves the optical scanner assembly 50 along the longitudinal axis 56 in a direction which is generally perpendicular to the scanning direction of laser beam 78. Since the linear translation system 52 moves the optical scanner assembly 50 during each scan line, the resulting scan lines may not be perpendicular, but are "generally" perpendicular to the direction of movement of the linear translation system.

In one exemplary embodiment, the film exposure area on the internal drum surface is 17 inches by 14 inches, suitable for exposure of a 17 inch by 14 inch piece of photosensitive film. In the exemplary embodiment disclosed herein, the film is exposed in a vertical direction. In particular, since the film is fed into the exposure module in the 14 inch direction and subsequently scanned in the 17 inch direction, the scanned raster lines appear in the vertical direction. The laser beam is scanned 180° (or greater than 180°) across the internal drum surface, for exposure of 17 inches across the photosensitive film. The linear translation system moves the optical scanner assembly along the longitudinal axis located at the center of curvature of the internal drum surface for a distance of 14 inches, for full exposure of a desired image/images on the photosensitive film.

The photosensitive film can be a photosensitive film which is sensitive to laser beam light. The film can be a light sensitive photothermographic film having a polymer or paper base coated with an emulsion of dry silver or other heat sensitive material.

Figure 4:
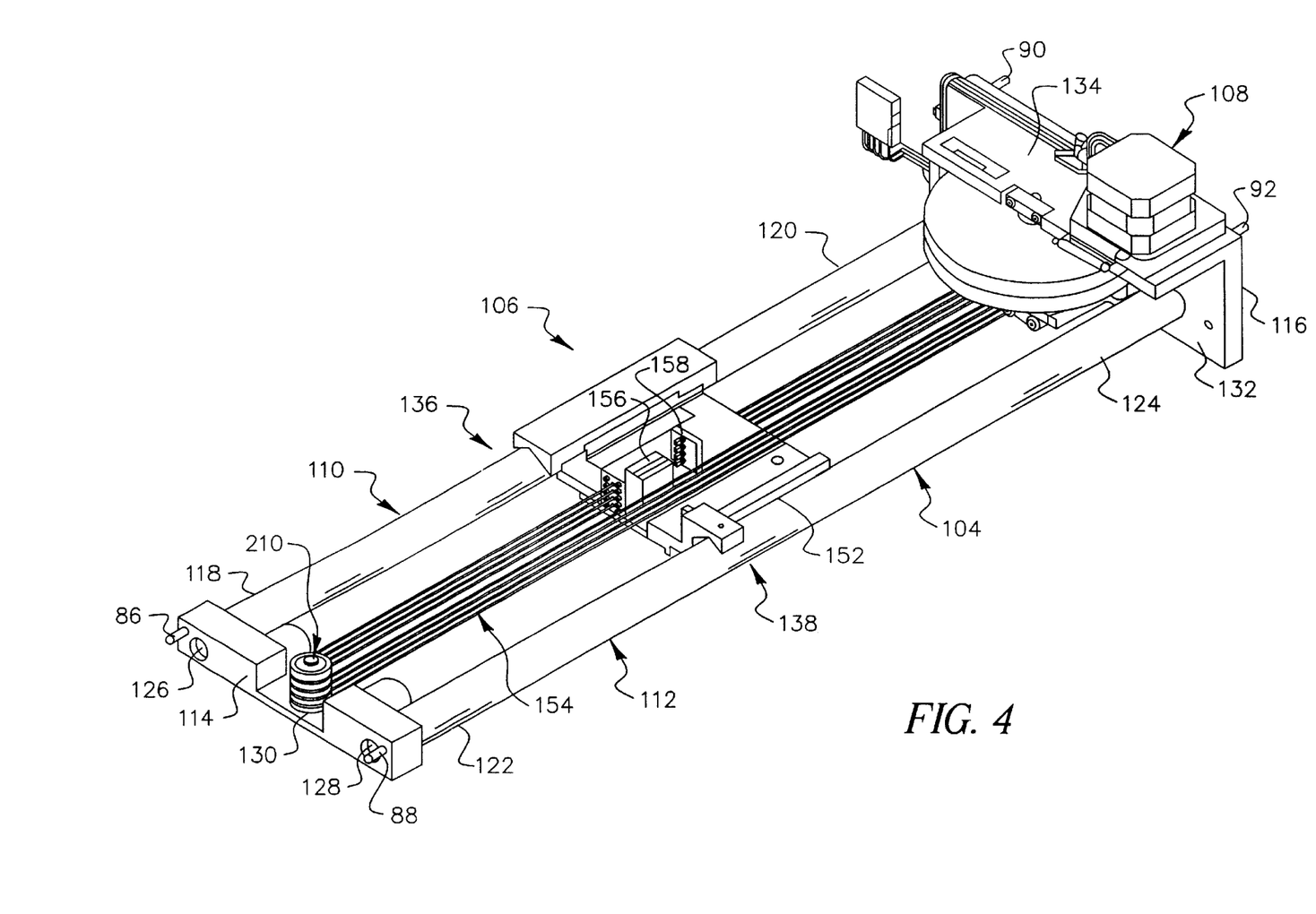
FIG. 4 is a perspective view of an embodiment of the present invention.
Figure 5:
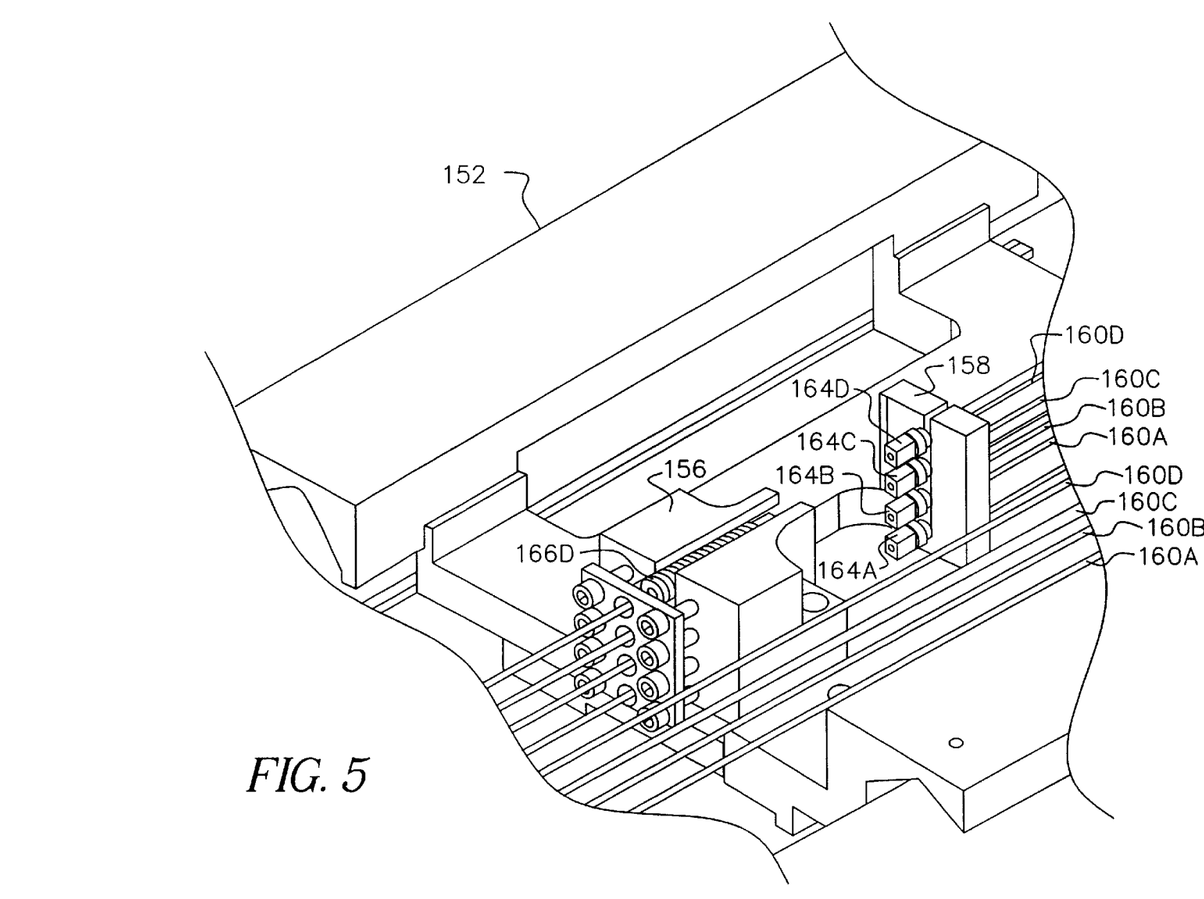
FIG. 5 is a detailed perspective views of the embodiment of FIG. 4.

Referring to FIGS. 4 and 5; a perspective view of one exemplary embodiment of a linear translation system for use in a laser imaging system in accordance with the present invention is shown, removed from the drum frame 54. The linear translation system 52 is uniquely designed to minimize velocity variation, allowing continuous scanning or continuous step scanning of an image during a laser scanning process.

The linear translation system 52 includes a base member 104, a carriage mechanism 106, and a rotary to linear motion mechanism or drive mechanism 108. The base member 104 is mechanically coupled to and held stationary relative to the drum frame, The carriage mechanism 106 is carried by the base member 104. The carriage mechanism 106 is coupled to (and carries) the optical scanner assembly or laser imaging assembly. The rotary to linear motion mechanism 108 converts rotary motion to linear motion for moving the carriage mechanism 106 along the base member 104 during the scanning process.

Base member 104 includes a pair of longitudinally extending guide rails, indicated as first guide rail 110, and second guide rail 112, which are positioned parallel to each other. In one exemplary embodiment, the guide rails 110, 112 are polished stainless steel guide rails. Further, the guide rails may include a lubricating coating thereon. In one preferred embodiment, the guide rails 110, 112 are coated with polytetrafluoroethylene (PTFE) (commercially available under the tradename TEFLON). Base member 104 further includes a first base bracket 114 and second base bracket 116. First guide rail 110 and second guide rail 112 extend longitudinally between first base bracket 114 and second base bracket 116. In particular, first guide rail 110 includes a first end 118 and a second end 120 and second guide rail 112 includes a first end 122 and a second end 124. The first guide rail 110, first end 118 is fixedly coupled to first base bracket 114 (e.g., by tapping and screwing into the first base bracket indicated at 126), and second end 120 is fixedly coupled to the second base bracket 116 in a similar manner. Similarly, the second guide rail 112, first end 122, is fixedly coupled to the first base bracket 114 (indicated at 128) and the second end 124 is fixedly coupled to the second base bracket 116 (indicated at 130).

First support pin 86 and second support pin 88 extend from first base bracket 114, and third support pin 90 and fourth support pin 92 extend from second base bracket 116. Further, first base bracket 114 includes recessed portion 130 which holds a portion of drive mechanism 108.

Second base bracket 116 is generally L-shaped, having a first leg 132, and second leg 134. The first guide rail 110 and the second guide rail 112 are fixedly coupled to the first leg 132. First leg 132 and second leg 134 are utilized as a support bracket for supporting and coupling other components of the rotary to linear motion mechanism 108, which will be described in detail later herein.

The carriage mechanism 106 is carried by the base member 104. In particular, the carriage mechanism 106 is coupled to the guide rails. Carriage mechanism 106 is slidably coupled to first guide rail 110, indicated at 136, and to second guide rail 112, indicated at 138. Carriage mechanism 106 is slid ably coupled to first guide rail 110 and second guide rail 112 at three locations using a unique kinematic design. Carriage mechanism 106 may also include a first retaining bracket 140 to maintain the carriage mechanism 106 on the guide rail 110.

Figure 6:
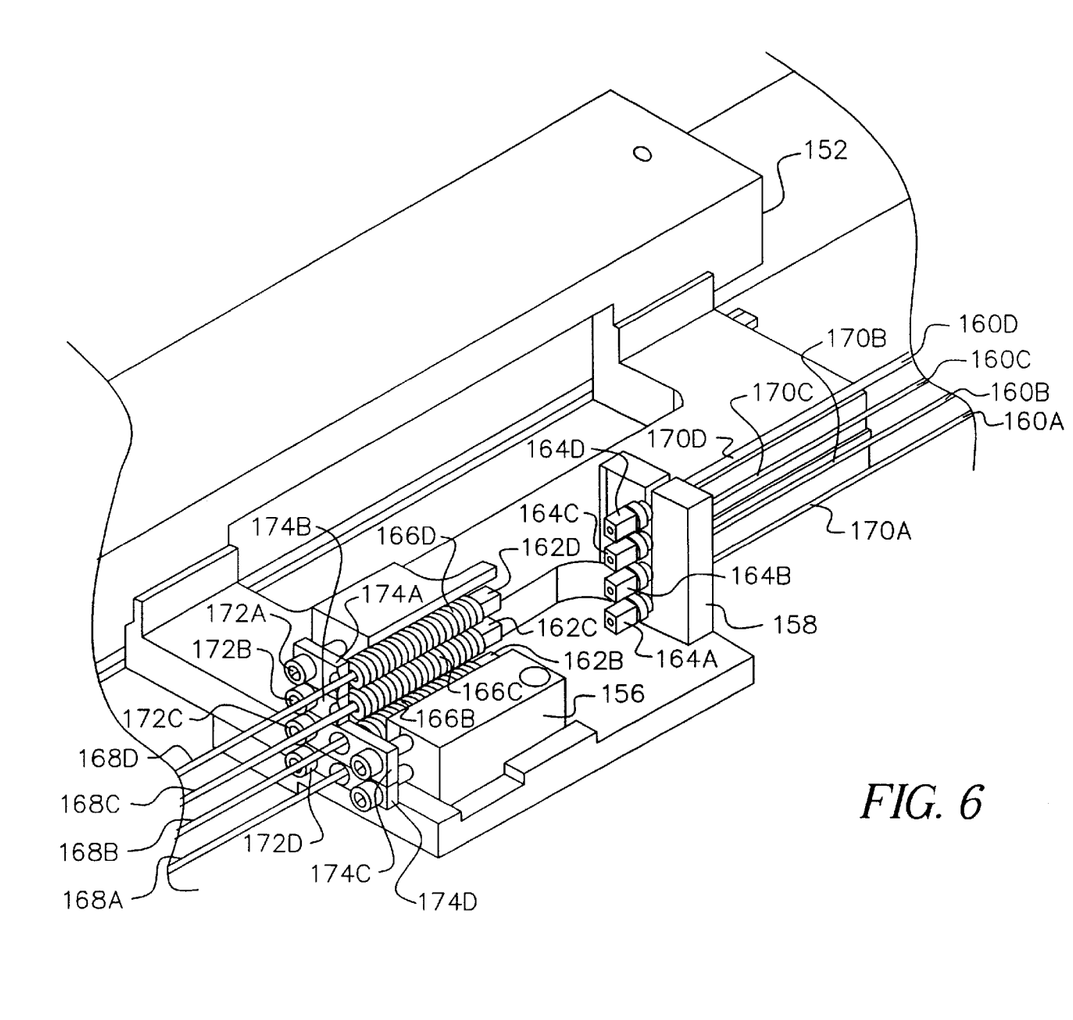
FIG. 6 is a cut-out view of the detailed perspective view of the embodiment of FIG. 4.

Carriage mechanism 106 includes carriage 152, and cable system 154. Carriage 152 includes a first termination bracket 156 and a second termination bracket 158. Multi-cable system 154 includes four cables 160A–160D cable terminators 162A–162D, 164A–164D and cable tensioners 166A–166D, as depicted in cut-out view in FIG. 6. In one exemplary embodiment, cables 160A–160D are a stranded steel cable. Each cable 160A–160D respectively has a first end 168A–168D which passes through first cable termination bracket 156 and terminates at cable terminator 162A–162D and has a second end 170A–170D which passes through second termination bracket 158 and terminates at cable terminator 164A–164D. Further, each cable tensioner 166A–166D (e.g., a spring mechanism) is positioned between first cable terminator 162A–162D and first termination bracket 156 to aid in maintaining independent tension in each cable 160A–160D. Cable tension adjustments are made by turning screw pairs 172A–172D, which push the springs through tensioning plates 174A–174D. Cables 160A–160D loop around grooved rotary member 210.

By using multiple drive cables, the optics translation system achieves a higher level of rigidity. For the drive system, the effective spring constant in the longitudinal direction is multiplied by the number of drive cables. Consequently, the translation system has a higher resonance frequency in the longitudinal direction, which is the main source of vibration noise for laser scanning applications. In addition, the increase in system stiffness also reduces susceptibility of the system to external disturbance to the optics translation system. Such disturbance may be introduced by impact or vibration due to components internal to the imaging system, or due to external motion from the environment.

The main reason for a separate tensioning mechanism for each drive cable is to eliminate the effects of drive cable length variation. By adjusting tension of each drive cable separately, all drive cables can be adjusted to have the same desired level of tension. With precise control of cable lengths, independent tensioning plates can be combined with a slid ably adjusted termination bracket 156.

Figure 7:
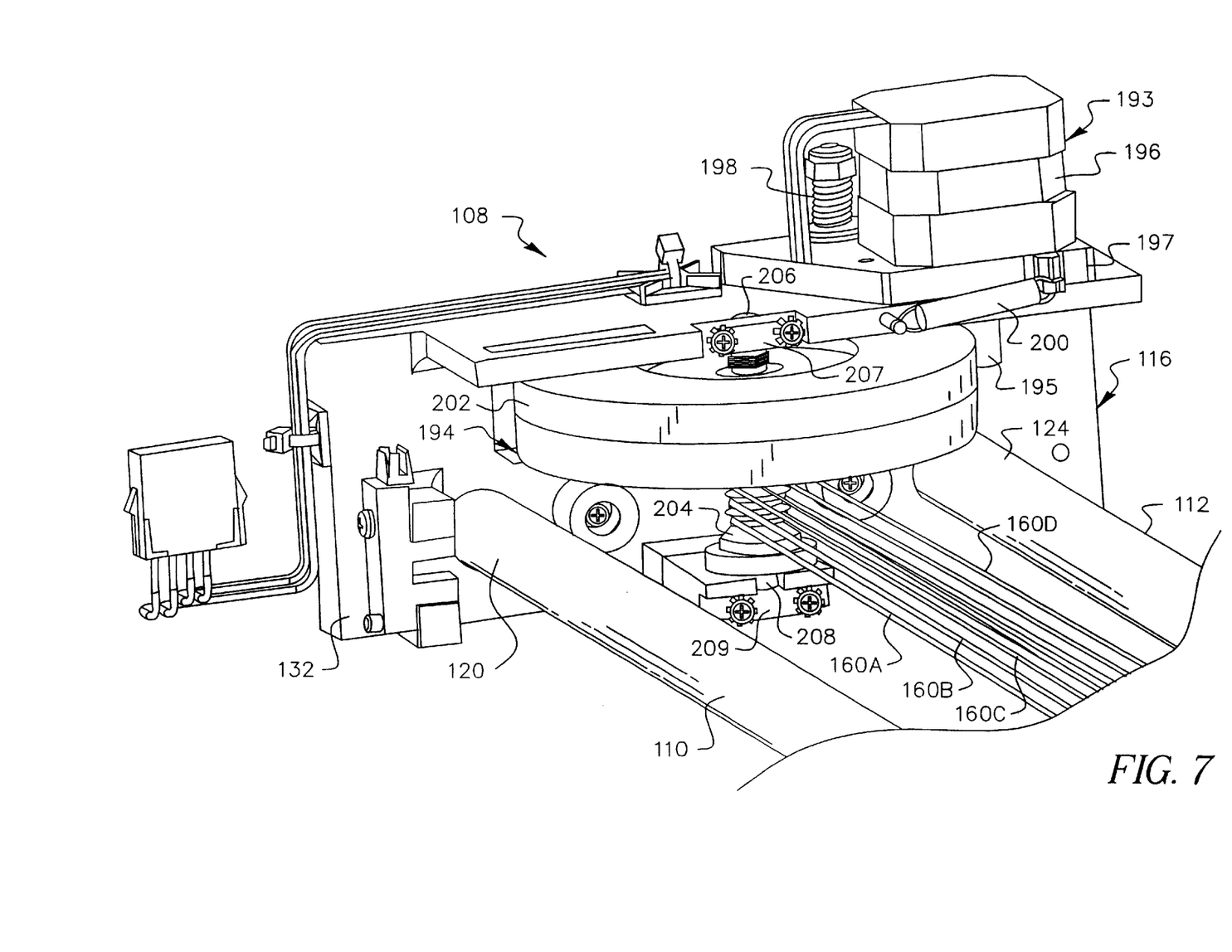
FIG. 7 is a diagrammatic view of the embodiment of FIG. 4.

Referring to FIG. 7 (and also FIG. 4) an end elevational view illustrating the rotary to linear motion mechanism 108 (hereinafter referred to as drive mechanism 108) is shown. Drive mechanism 108 transforms rotary motion into the linear motion required by movement of the carriage system on the guide rails. Drive mechanism 108 includes a motor mechanism 193, the flywheel mechanism 194, and a capstan 195. Motor mechanism 193 includes motor 196, motor mount 197, compression mechanism 198, and extension mechanism 200. Flywheel mechanism 194 includes flywheel 202 and cable drive pulley 204.

Motor 196 includes a rotating shaft which extends through the second base bracket 116, second leg 134. Capstan mechanism 195 is coupled to the motor shaft. Compression mechanism 198 is coupled between motor 196 and motor mount 197. Extension mechanism 200 is coupled between motor mount 197 and second leg 134. Flywheel 202 includes a shaft 206 extending therefrom which is fixedly coupled to second leg 134, indicated at bracket extension 207. Drive pulley 204 extends from a bottom surface of flywheel 202 and may be an integral part of flywheel 202.

Motor 196 is pivotally mounted with respect to second base bracket 116, second leg 134. The flywheel 202 is driven by motor 196 through the capstan 195. Capstan 195, mounted on the stepping motor shaft has a polyurethane cover which contacts the edge of the flywheel 202. The outside diameter of the capstan 195 is concentric to the motor 196. In particular, after the capstan mechanism 195 is mounted to the motor 196 shaft, the polyurethane cover is finish ground to remove any eccentricities due to the motor shaft and to minimize the runout of the capstan. The motor 196 and capstan mechanism 195 are then attached to the pivotal motor mount. The pivotal motor mount 197 is held down on the bracket second leg 134 through the compression mechanism 198 to minimize motor wobble. Further, nip pressure is created between the capstan mechanism 195 and the flywheel 202 by the extension mechanism 200.

The capstan mechanism 195 provides a gear reduction allowing the use of a higher speed motor and can include an aluminum core with a polyurethane coating. The polyurethane coating provides a compliant coating which grips the flywheel 202 as the motor 196 drives the flywheel 202 through the capstan 195.

Flywheel 202 adds inertia to the system to dampen out any artifacts that may be caused by the stepping motor 196. In one exemplary embodiment, flywheel 202 is made of a precision machined brass.

Drive pulley 204 is integrated with flywheel 202 and positioned along the flywheel axis of rotation. Drive pulley 204, in turn, has a shaft 208 extending therefrom which is fixedly coupled to second base bracket 116 indicated at bracket extension 209. Drive pulley 204 has V-grooves for retaining cables 160A–160D. Referring also to FIG. 4, an idler pulley 210 is positioned at the opposite end of the linear translation system 52, coupled to first base bracket 114.

The invention has been described in detail with particular reference to certain preferred embodiments thereof, but it will be understood that variations and modifications can be effected within the spirit and scope of the invention.

| PARTS LIST | |
|---|---|
| 30 | laser imaging system |
| 32 | film supply mechanism |
| 34 | film exposure assembly |
| 36 | film processing station |
| 38 | film receiving area |
| 40 | film transport system |
| 42 | imaging system housing |
| 44,46 | film transport path |
| 50 | optical scanner assembly |
| 52 | linear translation system |
| 54 | drum frame |
| 55 | curved film platen |
| 56 | drum longitudinal axis |
| 58 | scanning direction |
| 60 | directional arrow |
| 62 | first end |
| 64 | second end |
| 66 | first side |
| 68 | second side |
| 70 | bottom |
| 72 | top |
| 76 | photosensitive film |
| 78 | scanning laser beam |
| 80 | directional arrow |
| 86 | first support pin |
| 88 | second support pin |
| 90 | third support pin |
| 92 | fourth support pin |
| 104 | base member |
| 106 | carriage mechanism |
| 108 | drive mechanism |
| 110 | first guide rail |
| 112 | second guide rail |
| 114 | first base bracket |
| 116 | second base bracket |
| 118 | first end for first guide rail |
| 120 | second end for second guide rail |
| 122 | first end for second guide rail |
| 124 | second end for second guide rail |
| 126 | First base |
| 128 | first end (122) fixedly coupled to first base bracket (114) |
| 130 | second end (124) fixedly coupled to second base bracket (116) |

-continued

PARTS LIST

| | |
|---|---|
| 132 | first leg |
| 134 | second leg |
| 136 | carriage mechanism slidably coupled to first guide rail (110) |
| 138 | carriage mechanism slidably coupled to second guide rail (112) |
| 140 | first retaining bracket |
| 152 | carriage |
| 154 | multi-cable system |
| 156 | first termination bracket |
| 158 | second termination bracket |
| 160A–160D | stranded steel cables |
| 162 | cable terminators |
| 164 | cable terminators |
| 166 | cable tensioners |
| 168 | first end |
| 170 | second end |
| 172A–172D | screw pairs |
| 174A–174D | tensioning plates |
| 193 | motor mechanism |
| 194 | flywheel mechanism |
| 195 | capstan mechanism |
| 196 | motor |
| 197 | motor mount |
| 198 | compression mechanism |
| 200 | extension mechanism |
| 202 | flywheel |
| 204 | drive pulley |
| 206 | shaft |
| 207 | bracket extension |
| 208 | shaft |
| 209 | bracket extension |
| 210 | idler pulley |

What is claimed is:

1. A translation system comprising:

a linear support having first and second opposite ends, a carriage slid ably mounted on said support for movement in reciprocal linear directions between said first and second ends of said support;

a rotary drive rotatable in opposite rotary directions located at one end of said support, a rotatable member mounted at the other end of said support; and a multiple cable assembly attached to said carriage and extending around said rotary drive and said rotatable member moving said carriage in said reciprocal linear directions as a function of rotation of said rotary drive in said opposite rotary directions;

wherein said multiple cable assembly includes at least first and second spaced parallel cables having respective first and second ends attached to said carriage and first and second loops respectively trained about said rotary drive and said rotatable member;

wherein said first ends of said at least first and second cables are fixedly attached to said carriage and said second ends of said at least first and second cables are attached to said carriage by adjustable tensioning mechanisms for tensioning said cables about said rotary drive and said rotatable member; and wherein said tensioning mechanisms independently tension said at least first and second cables in order to accommodate different properties of said cables.

2. The system of claim 1 including an optical scanning assembly carried by said carriage.

3. A translation system comprising:

a linear support having first and second opposite ends;

a carriage slidably mounted on said support for movement in reciprocal linear directions between said first and second ends of said support;

a rotary drive rotatable in opposite rotary directions located at one end of said support;

a rotatable member mounted at the other end of said support; and a multiple cable assembly attached to said carriage and extending around said rotary drive and said rotatable member moving said carriage in said reciprocal linear directions as a function of rotation of said rotary drive in said opposite rotary directions;

wherein said multiple cable assembly includes four spaced parallel cables having respective first and second ends attached to said carriage and first and second loops respectively trained about said rotary drive and said rotatable member.

4. The system of claim 3 wherein said first ends of said four cables are fixedly attached to said carriage and said second ends of said four cables are attached to said carriage by adjustable tensioning mechanisms for tensioning said cables about said rotary drive and said rotatable member.

* * * * *